United States Patent [19]

Erickson et al.

[11] Patent Number: 4,544,490

[45] Date of Patent: Oct. 1, 1985

[54] METHOD AND SYSTEM FOR RECOVERING COAL FINES FROM PIPE LINE COAL SLURRY

[75] Inventors: Paul R. Erickson, Glendale; Kenneth A. Pietila, Milwaukee, both of Wis.

[73] Assignee: Rexnord Inc., Brookfield, Wis.

[21] Appl. No.: 569,135

[22] Filed: Jan. 9, 1984

[51] Int. Cl.$^4$ ............................................. B01D 37/00
[52] U.S. Cl. ..................................... 210/713; 210/724; 210/779; 210/790; 210/806
[58] Field of Search .................... 210/713, 724, , 729, 210/778, 779, 783, 790, 710, 781, 787, 806

[56] References Cited

U.S. PATENT DOCUMENTS

| | | | |
|---|---|---|---|
| 4,175,035 | 11/1979 | Moyer | 210/790 X |
| 4,203,839 | 5/1980 | Carr et al. | 210/778 |
| 4,290,896 | 9/1981 | Gordon et al. | 210/778 X |
| 4,315,824 | 2/1982 | Karolkiewicz et al. | 210/779 X |
| 4,346,010 | 8/1982 | Ogino et al. | 210/729 X |
| 4,354,947 | 10/1982 | Busse et al. | 210/790 |
| 4,402,834 | 9/1983 | Bastgen et al. | 210/790 X |
| 4,420,402 | 12/1983 | Bolton et al. | 210/783 X |

Primary Examiner—Thomas Wyse
Attorney, Agent, or Firm—John M. Neary; Lawrence J. Crain

[57] ABSTRACT

A method and system for dewatering coal fines from the centrate of a pipeline slurry centrifuge, to recover the coal and purify the water, includes blending the centrate from the centrifuge with slurry from the pipeline in the proportion of about 4:1. The blend is chemically conditioned agglomerating polymer, and then dewatered on a belt press. The cake from the belt press is dry enough to burn in the boiler, and the filtrate is clarified in a gravity clarifier. The clarifier effluent is clean enough for plant purposes or to return to the environment, and the clarifier underflow is returned to the blend for dewatering in the belt press. In a second embodiment, the blend is dewatered directly in a disphragm filter press without chemical conditioning, and the filtrate is clean enough to use directly without clarifying.

11 Claims, 4 Drawing Figures

METHOD AND SYSTEM FOR RECOVERING COAL FINES FROM PIPE LINE COAL SLURRY

BACKGROUND OF THE INVENTION

This invention relates to a method of removing minute suspended solid particles from a large volume of liquid, and more particularly to a method of recovering coal fines from coal slurry.

The increasing importance of coal as an energy resource to replace the higher price and political vulnerability of oil supplies has spurred conversion from oil fired to coal fired power plants. However, the transportation and environmental problems inherent in the use of coal have introduced significant delays in achieving full utilization of this abundant resource.

Coal slurry is the key to the solution of the transportation and environmental problems. To form a slurry, the coal is accurately ground in a precision crusher, such as the CAGE-PACTOR from Gundlach Machine Co. in Belleville, Ill., and is mixed with sufficient water to produce a slurry. In slurry form, the coal can be cleaned to remove clay and other contaminants, if necessary, and it can be pumped directly over long distances in a pipeline. Coal slurry pipelines are an efficient way of transporting large volumes of coal over long distances. They are especially attractive as a dedicated supply line to a large power complex because the supply is continuous and reliable, as proven by the Black Mesa to Mojave System, now in operation over ten years.

A particularly troublesome aspect of coal slurry operations has been the necessity of dewatering the coal slurry to sufficient dryness so that it may be conveniently handled and stored, and economically burned in the boiler. Slurry is normally dewatered in a two step process, known as primary and secondary dewatering. Primary dewatering is typically accomplished on a vacuum filter, or on a centrifuge, via filtration or centrifugation. These devices can process large volumes of coal slurry and produce a coal cake containing about 20% water. This cake can be pulverized, dried, and fed directly to the boiler. The primary dewatering devices have only one serious shortcoming: they fail to remove the fine coal particles from their filtrate or effluent. Indeed, this primary filtrate or effluent contains a significant amount of coal, often in the range of 5-8% coal by weight. It is actually a dilute coal slurry itself, which I will call the "secondary slurry" stream to distinguish from the "primary slurry" stream received by the primary dewatering device.

The secondary slurry has proven to be a difficult substance to handle. It is so difficult, in fact, that in some installations it is simply wasted to large lagoons where both the coal and the water are lost. However, the coal and water in the "secondary slurry" are both valuable resources, and the cost of these lost resources and the cost of building lagoons makes this solution a very undesirable one. Alternately, merely recirculating the secondary slurry back into the primary slurry stream is not appropriate because it hydraulically overloads the primary dewatering device. The third and heretofore most effective technique is to process the secondary slurry through a gravity clarifier which allows the coal fines to settle to the bottom of a large basin where they are drawn off as an "underflow" and fed directly to the boiler. This technique does recover the coal and the water, but it is wasteful of the heating value of the coal since large amounts of energy must be expended to vaporize the water in the clarifier underflow which usually exceeds 80%.

To concentrate the solids content of the clarifier underflow or centrate and reduce its water content, several secondary mechanical dewatering or filtering devices such as the belt press or the filter press have been tried. However, it has been found that the solids content in the underflow often produced a gummy, sticky cake that sticks to the filter media and produces such severe handling problems that the use of these devices to dewater the centrate or underflow was considered inappropriate.

Thus, there existed prior to this invention, a serious need for an efficient and effective method for recovering substantially all of the coal fines from the secondary slurry and purifying the water therein to sufficient purity that it can be used in plant processes or returned to the environment.

SUMMARY OF THE INVENTION

Accordingly, it is an object of this invention to provide a method and system for separating fine particles from the secondary slurry and clarifying the water therein. Another object of the invention is to provide a method and system for dewatering the secondary slurry fines to the extent that they can be burned in a boiler efficiently.

These and other objects of the invention are attained in the two embodiments of the invention in which the secondary slurry is blended with primary coal slurry. The resulting blend can be processed through an automatic secondary filtering device without the handling problems previously encountered with centrate or dewatering clarifier underflow on these devices. In one embodiment, the blend is chemically pretreated to promote flocculation of the suspended solids. The blend is then processed on a belt press which produces a cake that can be pulverized and dried with the cake from the primary dewatering device and fed to the boiler. The filtrate from the belt press is clarified in a settling tank to produce a clean effluent and an underflow of concentrated solids which is returned to the blend to be recovered on the belt press. The other embodiment of the invention uses a diaphragm filter press which processes the blend without chemical pretreatment. The filter press produces a cake which can be pulverized with the primary cake and fed to the boiler, and a filtrate which is clean enough to use as plant process water or to return to the environment. In both embodiments, the proportionate blend of primary slurry to secondary slurry is such as to produce a solids blend from the two slurries in the range of about 1:4 to 4:1 by weight of bone dry solids, depending on the primary slurry size distribution.

DESCRIPTION OF THE DRAWINGS

The invention and its many attendant objects and advantages will become better understood upon reading the following detailed description of the preferred embodiments in conjunction with an examination of the drawings, wherein.

DETAILED DESCRIPTION OF THE PREFERRED EMBODIMENTS

Figure 1:
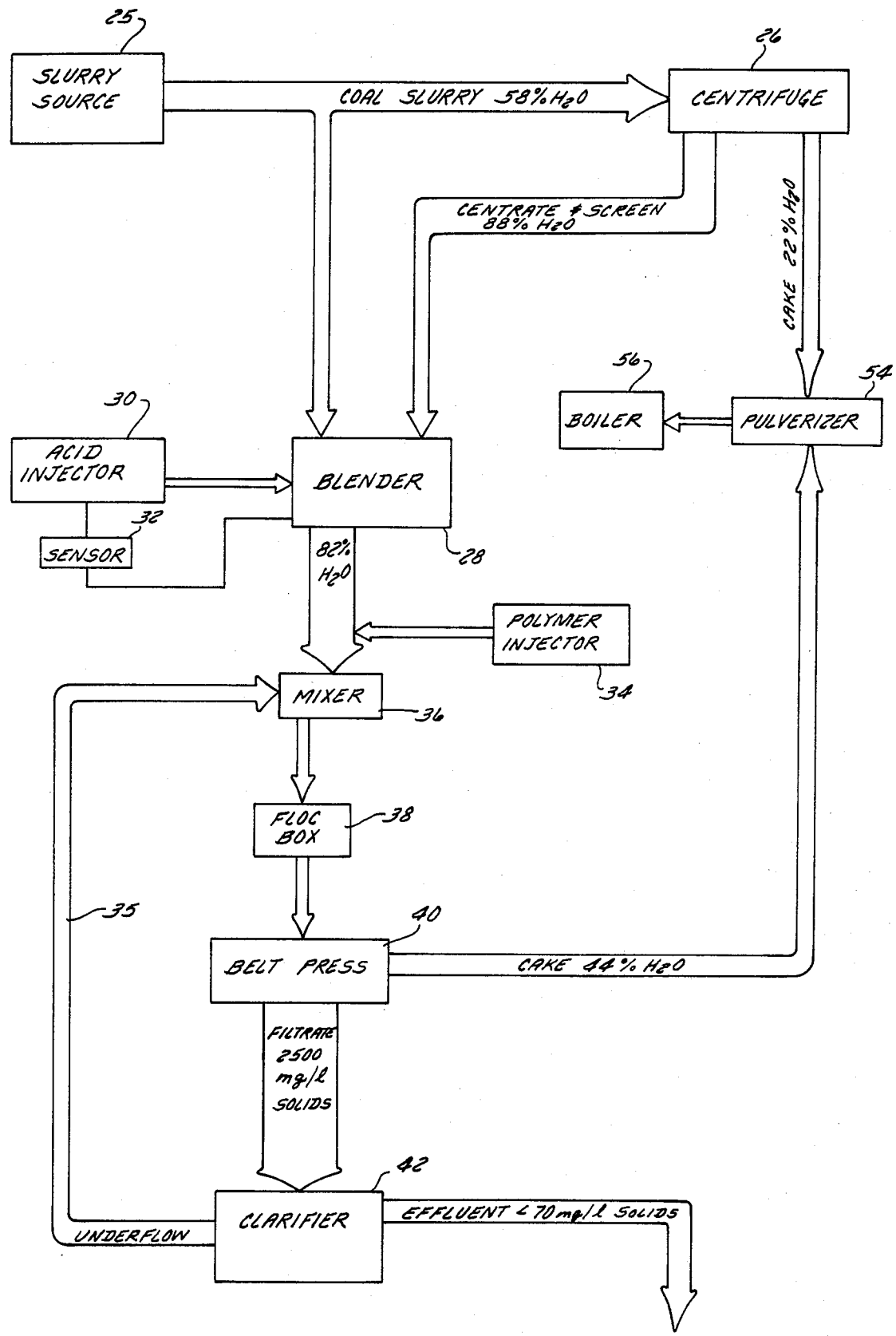
FIG. 1 is a process flow diagram of a slurry dewatering system according to this invention utilizing a belt press.

Referring now to the drawings wherein like reference characters designate identical or corresponding parts, and more particularly to FIG. 1 thereof, a flow diagram for a slurry dewatering system according to this invention is shown having a primary dewatering device such as a centrifuge 26 which receives most of the primary coal slurry stream from the slurry source, such as a pipeline 25. The centrifuge 26 produces a substantially dry coal cake at about 20% water. The effluent from the centrifuge 26, referred to herein as the "secondary slurry", contains about 85-95% water, and about 60% of the suspended solid particles are smaller than 400 mesh. These solids, when dewatered, form a sticky, gummy paste which adheres to the filter mesh and cloth of the automatic secondary pressure filtration dewatering apparatus and is otherwise hard to handle. In addition, the cost of the large volume of polymer necessary to produce a floc which is required to prevent the suspension from squeezing through and around the belts in the apparatus is excessively expensive.

We have found that the secondary slurry becomes much easier to dewater and handle when it is mixed with a portion of a coarser coal slurry, such as the primary slurry from the source 25. We have found that the proportion range is 1:4–4:1 primary coal slurry to secondary slurry, respectively, by weight of bone dry coal solids suspended in the slurries.

Our theory as to the explanation for this effect is that the coarser particles of coal in the coal slurry tend to entrap the finer or 400 mesh coal, and produce a precoat or filter aid effect. Then, in initial filtration, a sufficient coarser particulate inventory reaches the slurry/media interface. Media blinding and/or significant loss of fines through the media is avoided as filtration pressures are incrementally increased. The cohesion of fines to the coarser fraction is not critical, however, adhesion of fines to the media is avoided.

Analysis of the surface changes for various portions of the coal size gradation also explain why blending enhances slurry dewatering. One hundred percent pipeline slurry requires a high molecular weight cationic polymer, i.e. overall bulk surface charge on the coal is generally negative. The −400 mesh material alone requires a nonionic polymer while the compacted fines require a low molecular weight anionic polymer, i.e. compacted fines are positively charged. Thus, the 100% pipeline, negative charges set off or partially neutralize the positively charged fines. This is verified emperically where 100% fines require two to three times the polymer required in the 1:3 blend.

Figure 2:
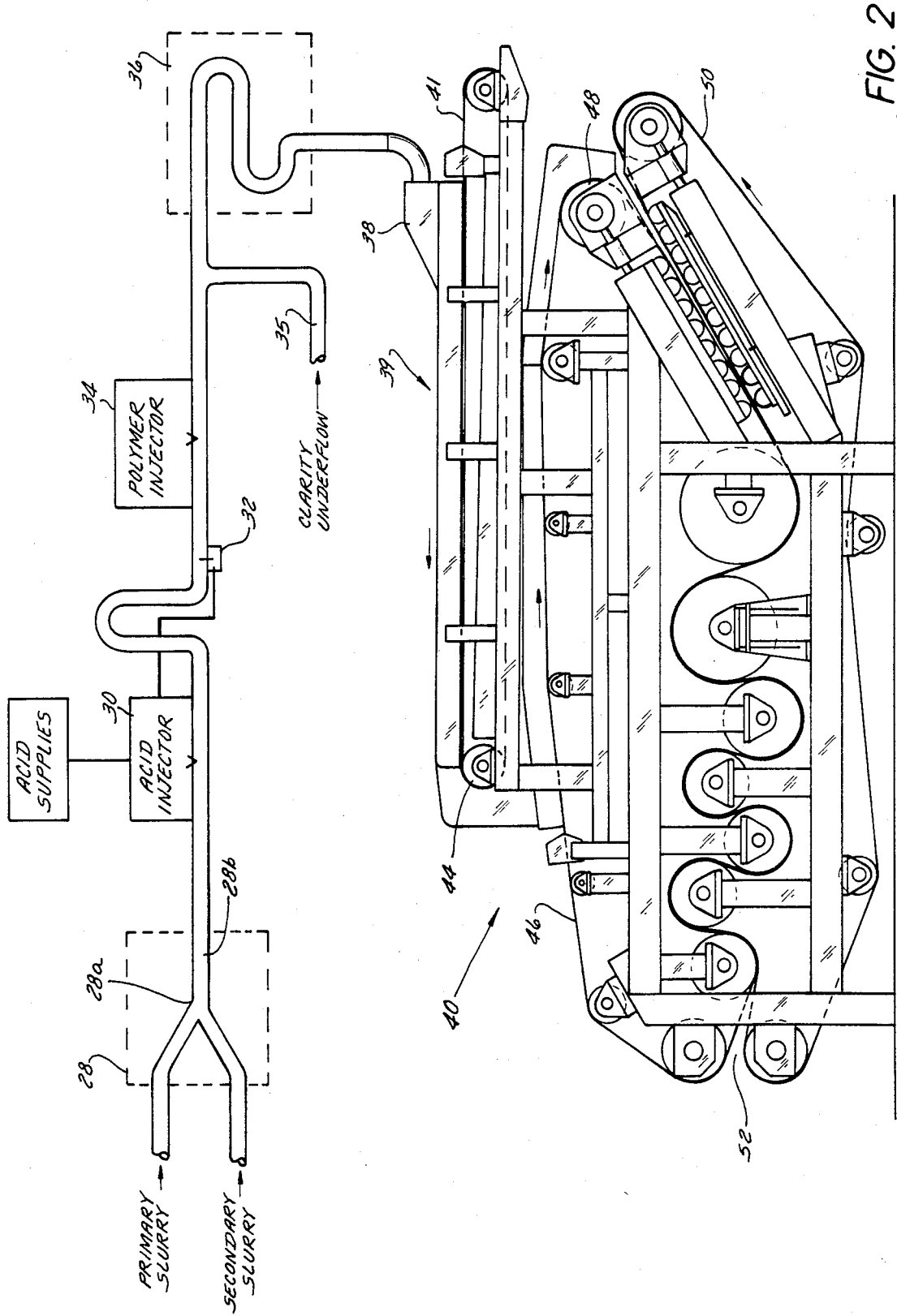
FIG. 2 is a schematic diagram of a belt press having blending, mixing, and flocculating piping and chambers associated therewith, for carrying out the process steps of the process illustrated in FIG. 1.

The secondary slurry stream from the centrifuge 26 is blended with the primary slurry stream from the source 25 to thoroughly mix the two streams and promote desirable agglomeration. The blending is accomplished, as shown in FIG. 2, by connecting the pipes carrying the two streams in joint 28a inserting elbows or baffles in the pipe section 28b.

The blend is chemically pretreated to promote agglomeration. The particular pretreatment used will vary depending on the constituents of the slurry. The best technique for discovering the materials and quantities thereof that are effective to achieve the desired flocculation is to gradually add various known flocculation-promoting polymers to test samples of the blend and observe the results. This is faster and more certain than theoretical analysis of the surface charge and other parameters of the particles in the blend. The temperature and pH of the blend may also affect the polymer effectiveness.

In one example, the pH of the blend was adjusted by injection of sulphuric acid to produce a pH of 6.1. In this example, the volume of polymer necessary to achieve the desired flocculation and agglomeration was minimized when the acidity of the blend was lowered to about 6.1. The acid may be injected into the blend by a suitable injector 30. The volume of acid injected is controlled by a pH sensor 32. Since slurries from different mines will normally differ from each other, the acid injector is merely illustrative of the chemical adjustment that is often needed for optimum agglomeration of the blended slurries.

The blend is then mixed with a polymer to promote agglomeration. Two polymers work well for this purpose; Dow 209 sold by the Dow Chemical Corporation and Percol 757. The Dow 209 polymer is an anionic polymer utilized at a rate of about 4 pounds of polymer per ton of dry solids in the slurry. The polymer is mixed with the blend by metered injection by an injector 34 into the pipe carrying the blend from the blender 28. The blend is mixed in a mixer 36 with the underflow added through pipe 35 from the clarifier. The mixer 36 can be the same structure as the blender 28, or it can be an agitating type mixer that would ensure thorough mixing and also promote flocculation and agglomeration. The underflow or concentrated flow of suspended solids from the clarifier also carries a residual recycled charge of polymer to assist in the recovery of the coal fines in the belt press, and this recovered portion of the polymer constitutes a savings in addition to the savings represented by the recovered underflow.

The mix of blend, polymer and underflow, which is at about 82% water, is passed through a mixing and holding box, or flocbox 38 which promotes flocculation or agglomeration of the coal fines in the suspension with the other coal fines and also with the larger coal particles from the coal slurry. The agglomerated mixture flows out of the flocbox 38 onto a free drain deck 39 of a belt press 40, shown schematically in FIG. 3.

Figure 3:
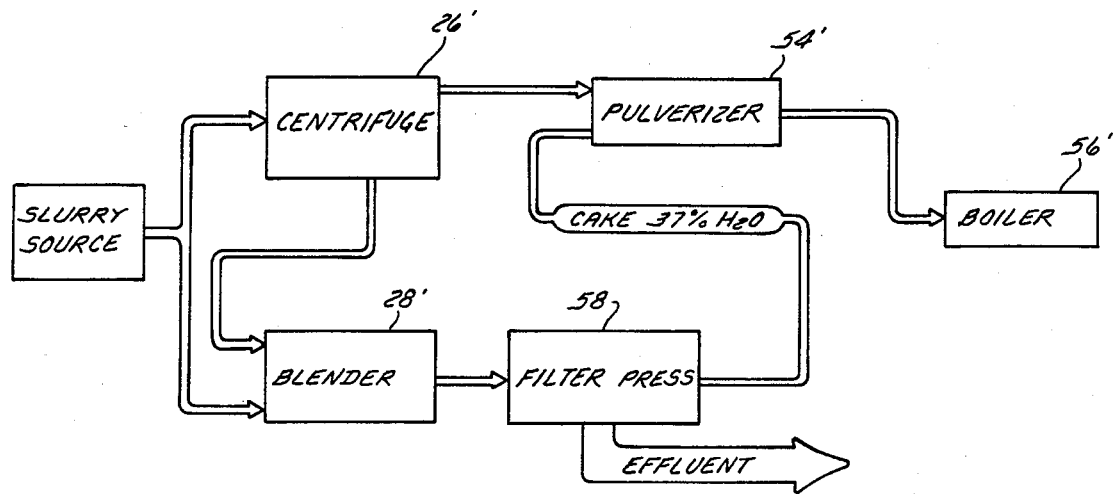
FIG. 3 is a process flow diagram of a second embodiment of the invention utilizing a filter press.

The free drain deck of the belt press is disclosed in the copending application Ser. No. 540,461 of Crandall filed Oct. 28, 1983 and entitled "Belt Press." The disclosure of this application is incorporated herein by reference. On the free drain deck, a large percentage of the water in the agglomerated coal slurry drains through a mesh belt 41 and this filtrate is collected and conveyed to a gravity clarifier 42. At the end 44 of the free drain deck the now concentrated coal slurry drops onto the top of the upper belt 46 of the belt press and is conveyed by the moving belt horizontally to the right as shown in FIG. 3 while the water in the slurry continues to drain through the belt. At the end 48 of the top run of the upper belt, the coal slurry drops onto the top of the lower belt and is conveyed back to the left into the converging section between upper and lower belts where the belts are pressed together to begin to squeeze the water from the slurry between the two converging belts. The two belts are trained around a series of rolls which press the belts together with increasing pressure to squeeze additional water from the coal slurry. In addition, the belts reverse direction around every set of rollers which creates a slight differential travel between the two belts, and therefore, shears the coal cake between the belts to create additional drain channels for the water still held in the slurry. The water squeezed through the belts is collected on a drain trough and is conveyed to the gravity clarifier 42 along with the water drained from the slurry in the free drain deck 39. The coal cake which emerges at the left end 52 of the belt press contains about 44% water. This cake is dry enough, when added to the primary dewatered coal and pulverized, to burn without further drying. It is mixed and pulverized with the cake from the centrifuge 26 in the pulverizer 54. The powdered coal is blown directly into the boiler 56 where it burns to produce steam for the generator 20.

The filtrate from the belt press contains about 2500 milligrams per liter of suspended solids and a significant amount of the polymer which was mixed with the blend. The polymer is associated with the solids in the filtrate and therefore recovery of these solids is important for the purpose of polishing the filtrate to produce a clean effluent, recovery in the coal value of the solids in the filtrate, and recovery of the polymer associated with these solids. This final polishing is accomplished in the gravity clarifier 42 which is a large settling tank of the type shown in U.S. Pat. No. 3,717,257, the disclosure of which is incorporated herein by reference. The filtrate enters the clarifier 42 through an annular influent channel at the outside periphery and is directed downwardly into the tank by a depending annular skirt which also quiets any turbulence that the entering filtrate might create in the settling tank. The suspended solids in the filtrate settle to the bottom of the tank and the clean effluent is drawn off into an annular peripheral launder which is radially inside and adjacent to the influent channel. The clean effluent is available for plant water requirements such as wash water for the centrifuge, the belts on the belt press, and as may be additionally treated and used makeup for cooling water for the power plant.

The solids which have settled to the bottom of the clarifier are drawn off and are pumped back to the mixer 36 to be mixed with the blend and the polymer upstream of the belt press. The polymer which is associated with the underflow solids from the clarifier is thus recovered for promoting agglomeration of the coal slurry stream to the belt press.

Figure 4:
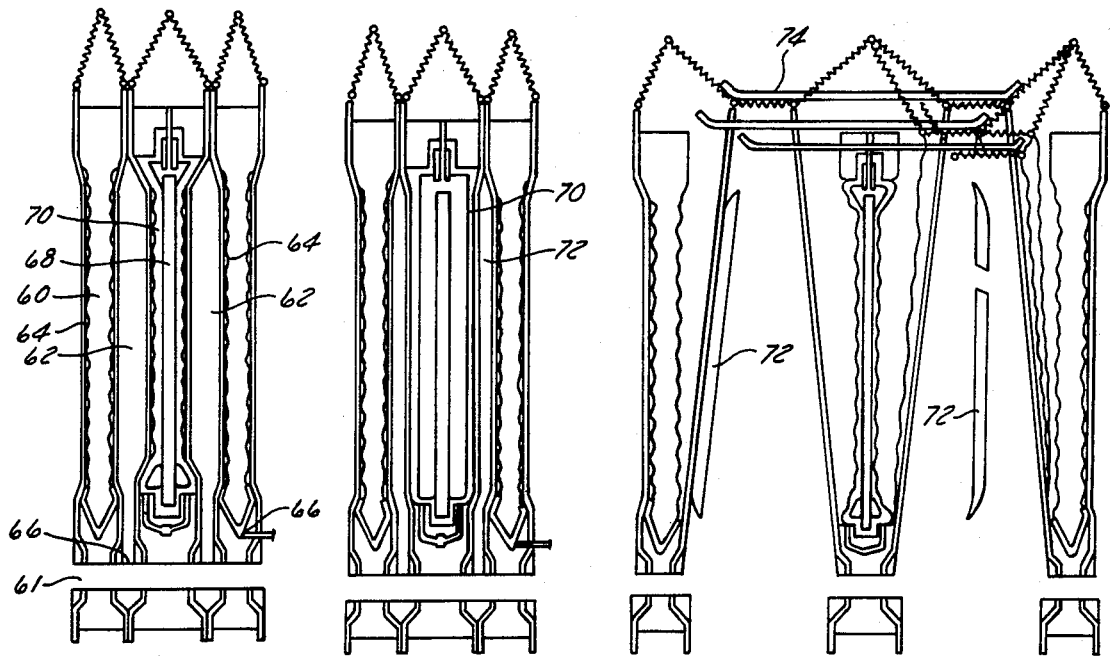
FIG. 4 is a schematic diagram of a filter press utilized in the embodiment of FIG. 3.

The second embodiment of the invention shown in FIG. 4 is a slurry dewatering system which utilizes a filter press. The filter press may be of the type shown in U.S. Pat. Nos. 3,696,939; 3,730,345; 4,132,647; the disclosures of which are incorporated herein by reference. The filter press is manufactured and sold by Envirex Inc. of Waukesha, Wis.

The filter press embodiment of the invention shown in FIG. 4 uses the same centrifuge 26' as the embodiment in FIG. 2 and blends the centrate from the centrifuge with a portion of the coal slurry directly from the pipeline 10' in the same range of proportions, viz. 4:1. The pipeline feed and the centrate are blended in the blender 28' and fed directly to a filter press 58 without the need for chemical pretreatment. The cake from the filter press 58 is only about 37% water and is suitable for burning without further drying. The cake is conveyed by conveyor belt to the pulverizer 54' where it is mixed and pulverized with the cake from the centrifuge and is blown into and burned in the boiler. The filtrate from the filter press 58 is exceptionally clean and can be used directly for plant purposes such as washing the filter cloth in the filter press or for cooling water in the power plant. This filtrate contains approximately 10 milligrams per liter of suspended solids and therefore there is no need for further polishing of the filtrate in a clarifier or the like.

The advantages of the filter press embodiment of the invention are significant. It does not require chemical pretreatment and indeed does not require any polymer injection at all. It does not require the capital cost and land requirements of a clarifier and the effluent is much cleaner than most requirements. The cake produced by the filter press is substantially dryer than the cake produced by the belt press so that less of the heating value in the coal need by used to convert water to steam. However, the filter press is more costly than the belt press and has a smaller capacity. In a specific example of a large coal fired power plant having a capacity of about five and one-half million tons of dewatered coal per year, the capital cost for a belt press installation would include eight belt press units of two and one-half meter capacity at a cost of about 3.2 million dollars but would require 25 filter press units of 150 chamber capacity at a cost of approximately 37.5 million dollars. The savings in chemical pretreatment, improved cake dryness and elimination of the clarifier would have to be evaluated in each particular care to determine whether this high initial capital cost makes the overall filter press system of FIG. 4, despite its simplicity and economy, more expensive than the belt press system of FIG. 2.

The operation of the filter press is illustrated in FIG. 5. In the filtration stage, the plates 60 are all clamped together with a hydraulic ram and slurry is pumped through an inlet manifold 61 into the chambers 62 between the plates under about 100 psi. Water filters through the filter cloth 64 and the slurry pumping continues until a predetermined filtering time has elapsed. The filtrate passes through the cloth 64 on both sides of the chambers 62 and drains into drain channels 66 at the bottom of the filter plates and is there pumped out to the effluent line.

After the filtration period, the squeezing period commences in which water is pumped into the diaphragm plate 68 between every other plate 60 under high pressure, in excessive of 200 psi. This high pressure water expands a diaphragm 70 to compress the cake on both sides of the chamber into a thin uniform cake 72 having a solids content of about 63%. The thinness of the cake insures that the water content throughout the cake is uniform and facilitates pulverizing. At the end of the squeeze cycle, the plates separate and the cake drops onto a underlying conveyor belt which carries the cake to the pulverizer. A vibrating shoe 74 may be provided to facilitate the release of the cake.

Thus, two embodiments of a method for recovering fines from pipeline coal slurry have been disclosed which enable recovery of virtually all of the suspended solids in the pipeline water and purification of the water to such an extent that it can be used for plant purposes or returned to the environment. It is a profound improvement over the alternative which is wasting the clarifier underflow to lagoons or delivering clarifier underflow to the boiler at vast losses of heat energy and water. This method enables utilization of reliable, efficient and effective automatic filtering apparatus which has been proven in use and whose cost is recovered in a mere two and one-half years of operation in the savings gained by the full and efficient utilization of the resources.

Obviously, numerous modifications and variations of the preferred embodiments disclosed herein will occur to those skilled in the art upon reading this disclosure. These modifications and variations, and the equivalents thereof, may be practiced while remaining within the spirit and scope of the invention as defined in the following claims.

What is claimed is:

1. A method for thoroughly dewatering primary pipeline coal slurry which comprises coarsely and finely ground coal particles to recover for combustion substantially all of the suspended coal particles in said primary slurry and also to recover the water in which said particles were suspended in substantially clear condition, comprising:
    (a) in a primary slurry dewatering apparatus, separating said primary pipeline slurry into a secondary slurry comprising a liquid fraction and including a substantial portion of said finely ground coal particles, and a combustible cake fraction containing said coarsely ground coal particles;
    (b) blending a portion of said primary slurry into said secondary slurry from the primary dewatering apparatus to create a concentrated heterogenous mixture of coarsely ground and finely ground combustible coal particles which will be readily recoverable from a secondary slurry dewatering apparatus;
    (c) filtering the water from said blend on said secondary slurry dewatering apparatus to separate said blend into a combustible cake of combined coarse and fine coal particles and a filtrate having a solids content of less than 1.0%.

2. The method defined in claim 1 further comprising: clarifying said filtrate to concentrate substantially all of the remaining fine particles in an underflow; adding said underflow back into said combustible blend.

3. The method defined in claim 1, wherein a portion of said primary slurry is blended into said secondary slurry in a range of proportions from about 1:1 to 1:4 by weight of bone dry suspended solids.

4. The method of claim 1, further comprising: adding an effective quantity of agglomerating chemical(s) to said blend prior to said filtering step.

5. The method defined in claim 4, wherein said filtering step includes filtering the water from said blend in a belt press.

6. The method defined in claim 5, further comprising: separating the solids and the filtrate from said belt press in a gravity clarifier to produce a clean effluent water and an underflow with concentrated, recoverable, combustible solids; and
adding said underflow to said blend with said agglomerating chemical(s) prior to said secondary filtering step to recover the solids and agglomerating chemical(s) which passed through said belt press on the previous pass.

7. The method defined in claim 4, further comprising adjusting the pH of said blend before adding said agglomerating chemical(s).

8. The method defined in claim 7, wherein said pH adjustment is performed by adding sulfuric acid to said blend.

9. The method defined in claim 1, wherein said large volume separating means comprises a centrifuge.

10. A method of recovering coal fines from pipeline coal slurry for combustion purposes, comprising:
    primary dewatering of said pipeline coal slurry via centrifugation to separate the coarse particles larger than about 400 mesh from the pipeline coal slurry and leaving a centrate having a suspension of less than about 15% suspended solids of coal fines smaller than about 400 mesh in water;
    blending a portion of said pipeline slurry into said centrate to produce a blend of about 10-30% by volume of said pipeline slurry to about 90-70% by volume of said centrate;
    filtering the water from said blend on a belt press to separate said blend into a combustible blend cake having more than about 50% solids and a filtrate having a suspended solids concentration of greater than 70 mg/l;
    clarifying said filtrate in a settling tank to separate said filtrate into an effluent having a suspended solids content of less than 70 mg/l and an underflow having a suspended solids content of greater than about 2,000 mg/l; and
    adding said underflow to said blend to recover the underflow solids in said belt press.

11. A method of dewatering primary pipeline coal slurry to recover for combustion substantially all of the suspended particles in said primary slurry and also recover the water in which said particles were suspended in substantially clean condition, comprising:
    dewatering said primary slurry on a primary dewatering device to produce a combustible coal cake having about 20% water and a secondary slurry having a water content in the range of 85%-95%;
    blending a portion of said primary slurry into said secondary slurry to produce a blend having a range of proportions from 1:1 to 1:4 by weight of suspended solids from said slurries;
    dewatering said blend on a secondary dewatering apparatus to produce a coal cake having a water content of less than 50%, and a secondary filtrate having a solids content of less than 1%;
    clarifying said secondary filtrate to produce an effluent having a solids content of less than 70 mg/l and an underflow having a solids content of greater than 10% solids; and
    mixing said clarifier underflow with said blend prior to dewatering said blend on said secondary dewatering apparatus to recover the solids content of said underflow.

* * * * *